Figures 1, 2:
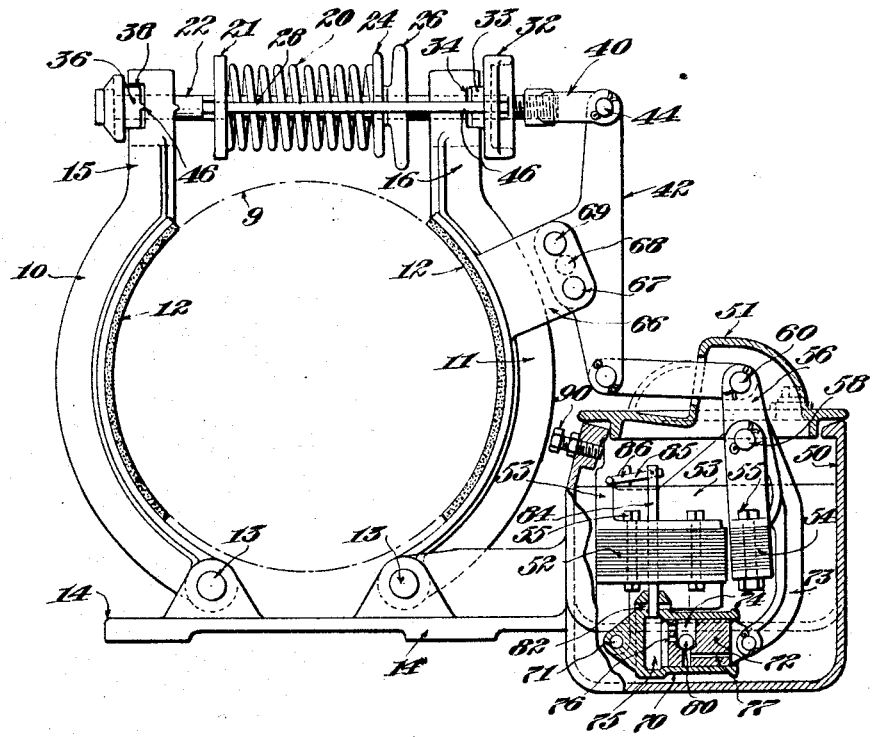

Nov. 20, 1928.

W. S. SMITH

ELECTROMAGNET

Original Filed July 28, 1922

1,692,056

Inventor
William S. Smith
by Francis W. Dakin
Attorney

Patented Nov. 20, 1928.

1,692,056

UNITED STATES PATENT OFFICE.

WILLIAM S. SMITH, OF CAMBRIDGE, MASSACHUSETTS.

ELECTROMAGNET.

Original application filed July 28, 1922, Serial No. 578,121. Divided and this application filed February 27, 1926. Serial No. 91,118.

This invention relates to electro-magnets, and although applicable for general use is designed more particularly for operating a brake mechanism for electric elevators and this application is a division from an application for improvements in electro-magnets, filed by me in the United States Patent Office, July 28, 1922, Serial No. 578,121.

The main object of the invention is to provide an electro-magnet simple in construction and efficient in operation comprising few parts and of low cost of construction.

Another object of the invention is the provision of an electro-magnet free from chattering, humming and other objectionable noises in its operation.

Other objects of the invention will be more particularly set forth and described hereinafter.

In the drawings showing one embodiment of my invention, Figure 1 is a side elevation, partly in section, of an electro-magnet constructed and operated in accordance with my invention and connected up to a brake mechanism for operating the same; Fig. 2 is a plan view of the same.

In the drawings showing the preferred embodiment of my invention, 9 designates a pulley or brake-drum secured on a moving part such as a rotating shaft, and 10 and 11 a pair of brake-shoes arranged one on each side of the brake-drum and each provided with a friction face 12; the brake-shoes being each pivoted at 13 to a suitable base or support 14. The ends 15 and 16 of the shoes 10 and 11 respectively may be extended upwardly and provided each with a vertical, open slot 17. Between the upper ends of the brake-shoes may be arranged an actuating spring 20 which is normally under compression and holds the brake-shoes in operative engagement with the brake-drum. One end of the spring abuts and is supported by an elongated washer 21 loosely mounted on a spring rod 22 which is in turn loosely mounted in the slots 17 in such manner that it can be lifted out when desired. The other end of the spring 20 abuts and is supported by a round washer 24 loosely mounted on the rod 22 which in turn is engaged and backed up by a winged nut 26 threaded on the rod 22. To prevent any turning of the elongated washer 21 it may be connected by two side rods 28 and 30 with an oblong washer 32 having a squared portion 33 engaging a recess 34 in the top 16 of the brake-shoe 11.

The spring rod 22 may on one end be provided with a squared head 36 engaging the recess 38 in the top of the brake-shoe 10 to prevent turning and in the other end may be threaded to receive a forked nut 40 to connect it to a releasing lever 42 by a pin 44. The movement of the brake-shoes 10 and 11 may be adjusted by withdrawing the pin 44, disconnecting the forked nut from the releasing lever 42 and turning the forked nut in one direction or the other on the rod after which the parts may be restored to their normal positions. The adjustment is necessarily made by half turns of the nut 40 but it may be made very fine by providing a fine thread on the bar 22.

To reduce friction and to prevent any binding, the inner faces of the squared portion 33 of the washer 32 and the squared head of the rod 22 may each be provided with a knife edge 46 bearing against the bottom of the recess so that when the brake-shoes are moved in releasing or setting the brakes, the knife edges permit of a rocking movement. This construction at the same time eliminates any noises which might be due to friction.

In its operation, the spring being under compression tends to push away from each other the washers 21 and 24 which support the two ends of the spring. This action, since the washer 21 is locked to the brake-shoe 11 through the medium of the washer 32 and the washer 24 is locked to the brake-shoe 10 by means of the rod 22, causes the two brake-shoes to be forced into operative engagement with the brake-drum. The spring 20, therefore, exerts a constant force and the brake-shoes are normally in operation.

Passing now to a description of the electro-magnet shown in the drawings, which constitutes the preferred embodiment of my invention, 50 indicates a casing, having a cover 51, within which are mounted a core 52 and an armature 54, the core being mounted on the frame 53. Both the core and the armature are preferably made up of laminations secured together in any suitable manner as by bolts 55. The armature is carried by an armature lever 56, pivoted at 58 on the magnet frame 53. The casing 50 of the magnet is filled with any suitable non-conducting oil to completely immerse the magnet, armature and dash-pot.

The armature lever 56 may be pivotally connected at 60 to a lever 62, which is in turn pivotally connected to the releasing lever 42, pivotally mounted in a bracket 66 forming part of the brake lever 11. The bracket 66 is provided with three holes 67, 68 and 69, to permit of various adjustments. As shown, the releasing lever is pivoted in the hole 68, which may be pivoted in either of the other holes for determining the relative movements of the spring rod 22 and the movement of the brake-shoes and of the armature. For instance, when the releasing lever is pivoted in the hole 67, the movement of the armature is less than it would be for the other two holes, but a greater pull is required to release the brakes. When pivoted in the hole 69, the armature moves further, but a less pull is required to actuate it. The hole 68 represents a compromise between these two extremes, in which the movement is a medium one, and the pull of the magnet necessary to operate the armature is also a medium one. A stop 90 adapted to be engaged by the brake-shoe 11 when it is released, tends to equalize the movement of the brakes.

For the purpose of eliminating the shock and noise ordinarily incidental to the operation of the armature when the magnet coil is energized, I provide a dash-pot construction made up of a cylinder 70 and a plunger 72 within said cylinder, one of said elements being fixed and the other attached to the armature. As shown, however, the cylinder is fixed, being pivotally mounted at 71 on the frame 53 and the plunger is pivotally secured upon an extension 73 of the armature lever 56 so that it moves in unison with the armature. By having the cylinder and plunger both pivotally mounted, any binding between the two during the movement of the plunger is prevented.

The plunger 72 is provided with a valve chamber 74 connected to the cylinder chamber 75 by a passage 76. A smaller passage 77 leads from the valve chamber 74 out through the plunger to the interior of the casing, and this latter passage is closed by an ordinary ball valve 80 when the plunger is moved inwardly. The cylinder chamber 75 may be connected to the interior of the casing outside of the dash-pot, by a passage 82, which passage may be controlled by an ordinary screw valve 84, having a U-shaped handle 85 at its upper end, which normally lies in a horizontal position over a pin 86 to prevent rotation of the valve 84 after adjustment. To adjust the valve the handle is raised and the valve is then turned as required and the handle dropped back over the pin 86. This screw valve may be omitted if desired, by predetermining the exact size of the passage 82 in order to get the necessary result.

The operation of the invention is as follows: When the magnet is deenergized the parts of the device are in the position shown in Fig. 1, and the brakes are applied to the moving member. In order to release the brakes the core 52 is energized by a switch, lever or other suitable means, thereupon the armature is caused to move into engagement with the core, thereby actuating the armature lever about the pin 58, as centre and moving the rod 62 from left to right, (referring to the drawings) to operate the releasing lever 42. The initial result is that the brake-shoe 11 is released and engages the adjustable stop 90. Up to this point the fulcrum of the lever 42 has been the pin 44; that is, the spring 20 and the shoe 10 are not affected in the beginning of the movement of the armature, but the brake lever is swung about the pin 44 until the brake-shoe 11 comes into engagement with the adjustable stop 90 which thereupon prevents any further movement of the brake-shoe 11 outwardly. The fulcrum then immediately changes from the pin 44 to the point 68, thereby throwing the rod 22 from right to left (referring to the drawings) and the force of gravity then causes the brake-shoe 10 to tip over to the left and release.

When the core is energized and the armature moves into contact therewith, the plunger 73 carried by the arm 73 is moved inwardly in the cylinder 70. The oil in the cylinder chamber is forced, by the pressure of the plunger, through the passages 76 into the valve chamber 74, thereby forcing the ball valve 80 to close up the passage 77. The only escape then for the oil in the cylinder chamber 75 is through the valve 82, so that until the oil in the cylinder chamber can escape through the valve 82, it acts as a cushion to retard the inward movement of the plunger, and, thereby, retard the contact of the armature with the core. At the same time, the film of oil between the armature and the core acts as an additional cushion to retard the flow and to prevent a shock, so that the engagement between the armature and the core, due to the thin film of oil therebetween, and to the action of the plunger in the dash-pot, is a gradual one and not a sudden movement. By gradual I do not mean that it is slow because the action is extremely rapid, still it is sufficiently gradual to eradicate the noise which would be given out by a sudden blow. By these means the noise is reduced to a minimum and that minimum is muffled by the oil in the casing so that to all intents and purposes the operation of my electro-magnet is noiseless.

It is to be observed that the illustrated embodiment of my invention is of extreme simplicity both in construction and operation and requires few parts, thereby conducing to economy of cost.

What I claim is:

1. An electro-responsive device comprising a magnet and an armature immersed in insulating liquid, one of said members being movable and the other fixed, and a dash-pot comprising a cylinder pivotally mounted on a fixed pivot and a pivotally mounted plunger movable therein and mounted on the movable one of said two first mentioned members; said cylinder being provided with an outlet valve opening and with means for varying the size of said opening; said dash-pot being immersed in said insulating liquid and using it as a medium to retard the movement of said plunger when said magnet is energized.

2. The combination with an electro-responsive device comprising a fixed magnet and a movable armature of a casing enclosing said device and adapted to be filled with a lubricating non-conducting liquid, a cylinder pivotally mounted within said casing and a plunger connected to said armature and movable in said cylinder, said plunger being provided with suitable passages permitting the flow of the said liquid therethrough when moved in said cylinder and said cylinder being provided with an outlet valve opening and with means for varying the size of said opening.

3. An electro-responsive device comprising a fixed magnet, a movable armature and a dash pot for retarding the movement of said armature when said magnet is energized, all being immersed in insulating liquid and said dash pot comprising a cylinder and a plunger movable therein and said cylinder being provided with an outlet opening and means for varying the size of said opening to regulate the retarding effect of said dash pot.

4. An electro-responsive device comprising a fixed magnet and a movable armature immersed in insulating liquid, and a dash-pot comprising a cylinder and a plunger mounted on said armature and movable in said cylinder, said cylinder being provided with an outlet valve opening and with means for varying the size of said opening to regulate the retarding effect of said dash-pot and said dash-pot being immersed in said insulating liquid and using it as a medium to retard the movement of said plunger when said magnet is energized.

5. An electro-responsive device comprising a magnet and an armature immersed in insulating liquid, one of said members being movable and the other fixed, and a dash-pot comprising a pivotally mounted cylinder and a pivotally mounted plunger movable therein and mounted on the movable one of said two first mentioned members; said dash-pot being immersed in said insulating liquid and using it as a medium to retard the movement of said plunger when said magnet is energized, said cylinder being provided with an outlet valve and with means for varying the size of said valve opening to vary the retarding effect of said dash-pot.

In witness whereof, I hereunto set my hand this twenty-sixth day of February, 1926.

WILLIAM S. SMITH.